United States Patent

[11] 3,619,670

[72] Inventor Gary L. Heimbigner
Anaheim, Calif.

[21] Appl. No. 876,513
[22] Filed Nov. 13, 1969
[45] Patented Nov. 9, 1971
[73] Assignee North American Rockwell Corporation

[54] ELIMINATION OF HIGH VALUED "P" RESISTORS FROM MOS LSI CIRCUITS
8 Claims, 6 Drawing Figs.

[52] U.S. Cl. .......... 307/304, 307/251, 307/215
[51] Int. Cl. .......... H03k 3/26
[50] Field of Search .......... 307/304, 205, 215, 218, 221 C, 246, 251, 279

[56] References Cited

UNITED STATES PATENTS

| | | | |
|---|---|---|---|
| 3,215,861 | 11/1965 | Sekely | 307/251 |
| 3,363,115 | 1/1968 | Stephenson et al. | 307/304 |
| 3,393,325 | 7/1968 | Borror et al. | 307/251 |
| 3,506,851 | 4/1970 | Polkinghorn et al. | 307/251 |
| 3,524,077 | 8/1970 | Kaufman | 307/221 C |
| 3,417,262 | 12/1968 | Yao | 307/215 |
| 3,430,071 | 2/1969 | Sheng | 307/215 |
| 3,484,625 | 12/1969 | Boarer | 307/215 |

*Primary Examiner*—Donald D. Forrer
*Assistant Examiner*—R. E. Hart
*Attorneys*—L. Lee Humphries, H. Fredrick Hamann and Edward Dugas

ABSTRACT: The circuit of the invention is capable of maintaining a static output, the level of which is at least as great as the circuit's potential supply. The circuit is comprised of complementary transistorized bootstrap circuits each of which uses a storage capacitor between the output of the transistorized bootstrap circuit and the gate of the output transistor of the bootstrap circuit, to temporarily maintain the output from each bootstrap circuit at the potential supply. Clocking means are provided to overlap the outputs from each bootstrap circuit so as to maintain the component's output at the level of the potential supply. Gating means are provided for logically switching the output between a reference potential such as ground and the potential supply.

INVENTOR.
GARY L. HEIMBIGNER

BY Edward Dugas
ATTORNEY

INVENTOR.
GARY L. HEIMBIGNER

BY Edward Dugas
ATTORNEY

ELIMINATION OF HIGH VALUED "P" RESISTORS FROM MOS LSI CIRCUITS

BACKGROUND OF THE INVENTION

In MOS type circuits, the static outputs of the circuits are maintained at substantially the power supply voltage (generally a negative voltage) by using external pullup resistors or internal "P" region resistors. The high value resistors, 20K ohms or more, take up large areas on the chip supporting the MOS devices. P region resistors of less than 20K ohms resistance dissipate a great deal of power; therefore, it would be highly advantageous to have a circuit wherein the P region resistor could be eliminated along with having the circuit take up less area and dissipate less power than the heretofore used P region resistors.

SUMMARY OF THE INVENTION

Briefly, the present invention provides a driven circuit which is capable of sustaining an output at least equal to the level of the circuit's potential supply without the use of large value P region resistors. In the preferred embodiment of the invention, this is accomplished by a pair of complementary bootstrap circuits connected to a common output terminal. Each of the bootstrap circuits is provided with a storage capacitor connected between the gate electrode and the source electrode of the load transistor used in the individual bootstrap circuits. Two-phase clocking means are provided to alternately charge the storage capacitors to a level substantially in excess of the potential supply so as to maintain the composite output at the potential supply level. Logic means are provided to switch the output between the potential supply level and a reference potential (ground) to provide true and false output signals which correspond to the input logic signals.

It is, therefore, an object of the present invention to provide a circuit capable of maintaining an output at the level of the circuit's potential source.

It is another object of the present invention to provide a two-state output circuit capable of maintaining an output for one state at least equal to the circuit's potential source.

It is yet another object of the present invention to provide a circuit capable of maintaining an output at the level of the circuit's potential source without the use of high value P region resistors.

These and other objects of the present invention will become more apparent and better understood when taken in conjunction with the following description and drawings, throughout which like characters indicate like parts and which drawings form a part of this application.

DESCRIPTION OF THE PREFERRED EMBODIMENT OF THE INVENTION

Figure 1:
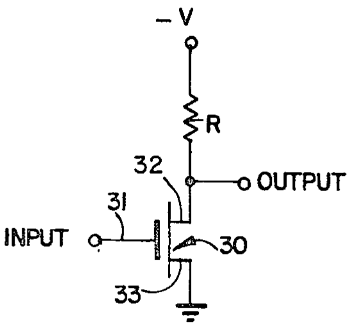
PRIOR ART FIG. 1
FIG. 1 illustrates a prior art circuit device with a P region load resistor in place.

Referring to FIG. 1 wherein the simplest form of a prior art device is shown, utilizing a single-field effect transistor 30, having a gate electrode 31, a source electrode 33, and a drain electrode 32; with the drain electrode connected to an output terminal and to a relatively large resistor R, generally 20K ohms or better, which in turn is connected to a potential source designated −V. The source electrode of the field effect transistor is connected to some reference terminal, for example, ground. In operation, a negative going input pulse on the gate electrode 31 turns the field effect transistor on which essentially connects terminal 32 to terminal 33, thereby effectively placing the output terminal at the ground, or reference potential. When the input signal is removed from gate 31, the field effect device is turned off and the potential −V appears at the output terminal. The amount of current which flows through the large resistor R and the terminals 32 and 33 when the device 30 is off is relatively very small, therefore, substantially the −V potential appears at the output terminal. The disadvantage of this circuit is the large area required to fabricate the load resistor.

Figure 1A:
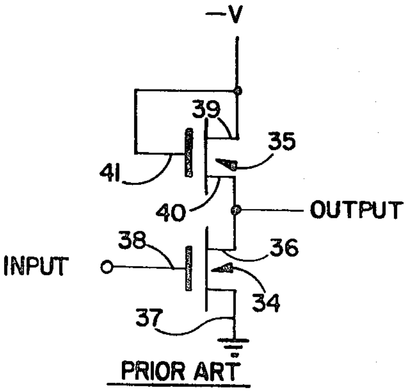
PRIOR ART FIG. 1a
FIG. 1*a* illustrates a prior art circuit which replaces the P region resistor with a transistor.

Referring to FIG. 1*a*, which is similar to FIG. 1, the load resistor is replaced with a single-field effect transistor 35, having a gate electrode 41, a source electrode 40 and a drain electrode 39. The gate electrode 41 and the drain electrode 39 are both connected to the potential source designated −V and the source electrode 40 is connected to the point designated as the output. The second field effect transistor 34 is operated the same way as was transistor 30 of FIG. 1. The output of FIG. 1*a* will never reach the −V potential because of the inherent gate electrode 41 to source electrode 40 drop of approximately 5 volts. It is this drop that is the disadvantageous feature of the circuit of FIG. 1*a*.

Figure 4:
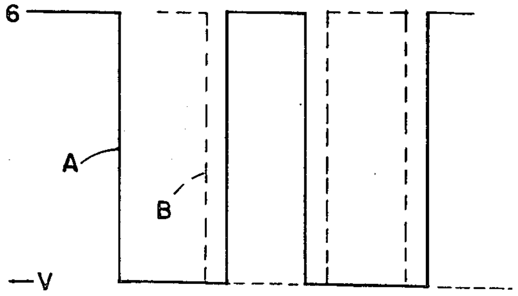
FIG. 4 illustrates an output waveform useful in understanding the operation of the invention.
Figure 2:
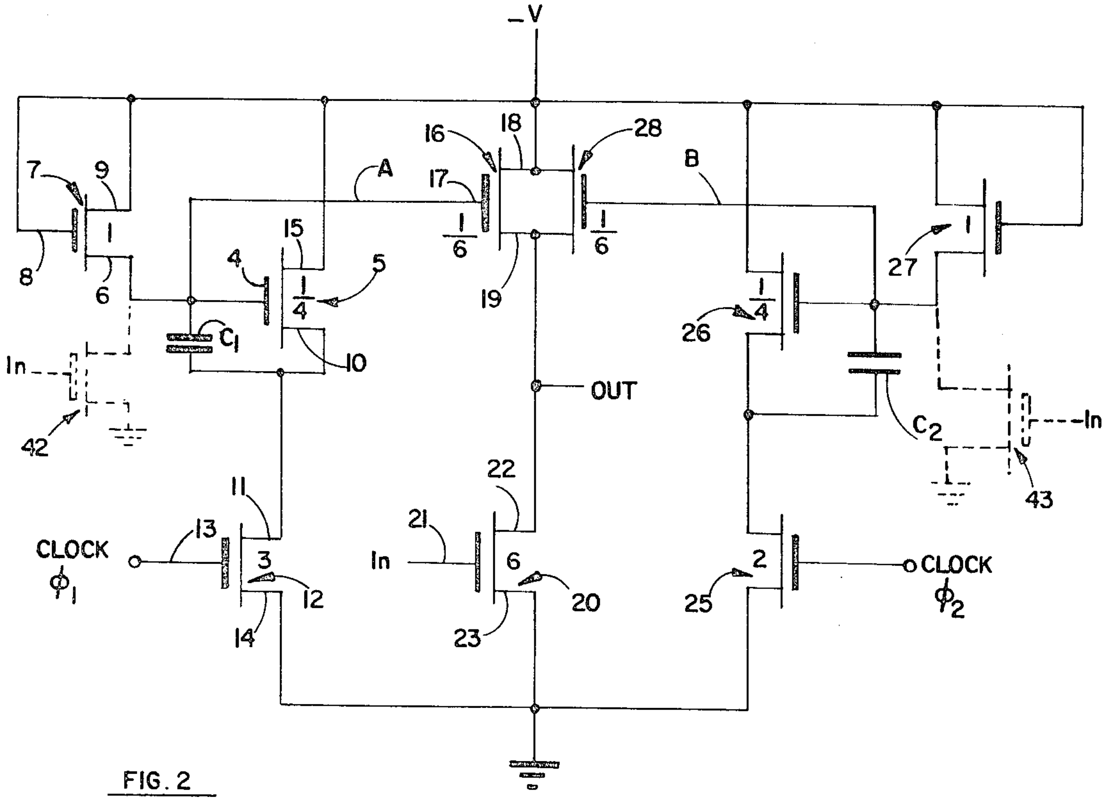
FIG. 2 illustrates in electrical schematic form the preferred circuit embodiment of the invention.

Referring now to FIG. 2 wherein is shown a substitute circuit which more effectively performs the same function as that performed by the circuit in FIG. 1 without the use of the large resistor R and without the undesirable voltage drop of FIG. 1*a*. Although the circuit of FIG. 2 is more complicated than the simplified circuit of FIG. 1, in actuality the total space taken on a substrate chip is less for the circuit of FIG. 2 than it is for that of FIG. 1, in that resistors, especially those having values greater than 20K ohms, have to be made up in terms of area. Therefore, if a more complicated circuit can be fitted into a smaller area, we actually have a savings on the total size of a circuit. The particular transistors used in the device of FIG. 2 are field effect transistors having gate, source, and drain electrodes. Field effect transistor 7 has its gate electrode 8 and drain electrode 9 connected to a potential source −V. The source electrode 6 is connected to the gate electrode 4 of transistor 5 and to the gate electrode 17 of transistor 16 and also to one terminal of the capacitor C1. The drain electrode of transistor 5 is connected to the potential source −V. The source electrode 10 is connected to the other terminal of capacitor C1 and to the drain electrode 11 of transistor 12. The gate 13 of transistor 12 is connected to one clock phase $0_1$. The source electrodes of transistor 12 and transistor 20 are connected to a common potential source, most commonly, ground. The drain electrode of transistor 16 is connected to the −V potential source and the source electrode of transistor 16 is connected to an output terminal and to the drain 22 of transistor 20. A complementary circuit identical to the aforementioned described circuit, consisting of transistors 28, 26, 27, capacitor C2 and transistor 25, is attached to the first described circuit. The operation of the device is identical for both sides except in timing. That is, the timing or the occurrence of events on one side do not occur simultaneously with the same events on the other side. The gates of transistors 16 and 28 are designated with letters "A" "B" respectively and the waveforms associated therewith are as shown in FIG. 4.

Figure 3A:
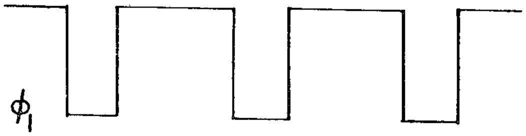
FIGS. 3*a* and 3*b* illustrate clocking waveforms useful in operating the circuit of FIG. 2.
Figure 3B:
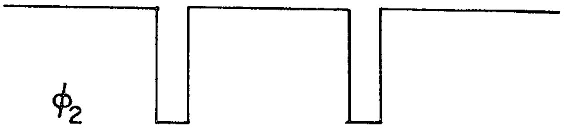

FIGS. 3*a* and 3*b* show the phasing of the clock pulses $0_1$ and $0_2$. It is necessary only that the two pulses not be negative at the same time and that their repetition rate be high enough to minimize leakage effects. The transistor 20 comprises the input logic means to the circuit. It would be obvious that several devices and various configurations may be used as the input logic means.

In operation, when a clock pulse $0_1$ is received on the gate 13 of transistor 12, transistor 12 is turned on, connecting one terminal of capacitor C1 to ground. Transistor 7 is held on because its gate 8 is connected to the −V potential source, causing its source electrode to be at least one threshold more positive than the gate electrode, causing capacitor $C_1$ to be charged to the voltage level of the supply, −V, plus the threshold voltage, $V_t$, of transistor 7. In effect, the capacitor is charged to the difference between the voltage at the source of transistor 5 and the voltage at the gate 4. Since the voltage at the source 10 of transistor 5 is approximately zero, the capacitor is charged to substantially the −V potential. When the capacitor is fully charged, transistor 12 is turned off allowing the source 10 to go negative which coupled through the capacitor to gate 4. When the clock pulse $0_1$ goes to zero, the gate of transistor 5 is now held more negative with respect to the source 10 by the charge on the capacitor C1. This, in turn, holds transistor 5 on, causing the gate electrode 4 to become more negative than the source electrode 10 by at least two threshold drops. Transistor 5 continues to turn on until the potential at the source 10 is set at −V volts. In the process, the gate 17 of transistor 16 has felt the charge on capacitor C1 in addition to the −V potential which later appeared at the source electrode 10. In turn, the gate electrode is turned on to a value which is more negative than the potential source which, in turn, causes the source electrode 19 of transistor 16 to have a value which is one threshold drop below the potential on the gate electrode 17 or −V, which ever is least negative. Therefore, if the potential on gate electrode 17 is greater than −V and we subtract the one threshold drop which occurs between electrodes 17 and 19, we now have an output at the output terminal equal to the −V potential supply. The input logic transistor 20 could, for example, at this time be turned on by a negative pulse upon gate electrode 21 which would effectively connect the output terminal to ground, assuming that the on resistance of transistor 20 is much less than the on resistance of transistors 16 and/or 28, providing a two-state signal which has a value of ground on one end and a −V potential at the other end. The charge which was initially stored on capacitor C1 dissipates in time due to, for example, interelectrode and other stray resistance losses. Therefore, it is necessary to recharge capacitor C1 in some cyclic manner in order to maintain a static output which is equivalent to or greater than the −V potential source. This can be done by allowing an identical circuit, which has previously been charged, to take over and hold the output at the −V level while the capacitor which has initially begun to discharge is recharged. This operation is performed by providing a complementary circuit identical in all respects to the first described circuit which operates from a second clock $0_2$ which is shown in FIG. 3*b*. The clocking pulses $0_1$ and $0_2$ themselves do not overlap, but their period is such that after inversion they do cause the output of the circuit to overlap as shown in FIG. 4 and, in summary, cause the gates of transistors 16 and 28 to be considerably more negative than the −V supply which turns on with essentially no threshold drop. Transistors 16 and 28 actually appear to be "OR"ed load resistors which simulate ordinary "P" region resistors because they have no offset and will pass current in either direction in a relatively linear manner. If in FIG. 2 two transistors 42 and 43 are added as shown with dotted lines, transistors 16 and 28 will not be turned on when transistor 20 is turned on, resulting in a push-pull or active driver circuit which can provide a large drive current and maintain this drive in either logic state indefinitely.

I claim:

1. A transistorized circuit comprising in combination:
a. a source of potential;
b. an input terminal and an output terminal;
c. a gated two-state load means connected between said source of potential and said output terminal, one of said states being low conductance and the other high conductance;
d. a complementary pair of bootstrap means connected to said load means to gate said load means between said two states;
e. clocking means, clocking said pair of bootstrap means into overlapping conductance; and
f. logic means connected between said output terminal and a reference point, and having its input connected to said input terminal, to switch the output signal between said reference point and said source of potential.

2. The invention according to claim 1 wherein said clocking means connects said bootstrapping means to the common reference point.

3. The invention according to claim 1 wherein each of said bootstrapping means is comprised of:
a. a first field effect transistor, the drain of which is connected to said potential source, the source of which is connected to said clocking means, and the gate of which is connected to said load means;
b. a storage capacitor connected between said source and gate of said first transistor; and
c. a second field effect transistor, the drain and gate of which are connected to said potential source, and the source of which is connected to the gate of said first transistor so as to charge said storage capacitor through a high conductance path and to provide a low conductance discharge path when said storage capacitor is charged.

4. The invention according to claim 1 wherein said gated two-state load means is comprised of a pair of field effect transistors, the drains of which are connected to said potential source, the sources of which are connected to said output terminal and the gate of one being connected to one of said bootstrap means, and the gate of the other being connected to the other of said bootstrap means;

5. The invention according to claim 3 wherein said clocking means comprises:
a. a pair of field effect transistors, one for each of said bootstrapping means, the drains of which are connected to the source of a corresponding first transistor and the sources of which are connected to the common reference point and the gates of which are connected to a source of two-phase clocking so as to alternately turn said pair of field effect transistors on and off at a rate which substantially maintains the charge on said storage capacitors.

6. A transistorized circuit comprising in combination:
a. a source of potential;
b. an input terminal and an output terminal;
c. a pair of load acting field effect transistors, the drains of which are connected to said potential source, and the sources of which are connected to said output terminal;
d. a pair of bootstrapping means, each comprised of:
1. a first field effect transistor, the drain of which is connected to said potential source, and the gate of which is connected to a gate of a load acting transistor;
2. a storage capacitor connected between the source and gate of said first transistor.
3. a second field effect transistor, the drain and gate of which are connected to said potential source, and the source of which is connected to the gate of said first transistor so as to charge said storage capacitor through a high conductance path and to provide a low conductance discharge path when said storage capacitor is charged;
e. clocking means connected to the sources of said first field effect transistors for clocking said pair of bootstrap means into overlapping conductance; and
f. logic means connected between said output terminal and the reference point, and having its input connected to said input terminal, to switch the output signal between the reference point and said source of potential.

7. The invention according to claim 6 wherein said clocking means connects said bootstrapping means to the common reference point.

8. The invention according to claim 6 wherein said clocking means comprises:
a. a pair of field effect transistors, one for each of said bootstrapping means, the drains of which are connected to the source of a corresponding first transistor and the sources of which are connected to the common reference point and the gates of which are connected to a source of two-phase clocking so as to alternately turn said pair of field effect transistors on and off at a rate which substantially maintains the charge on said storage capacitors.